United States Patent

Eyb

[15] 3,692,051
[45] Sept. 19, 1972

[54] FUEL SYSTEMS FOR VEHICLES, ESPECIALLY MOTOR VEHICLES
[72] Inventor: Wolfgang Eyb, Leonberg, Germany
[73] Assignee: Dr. Firma Ing h. c. F. Porsche KG, Stuttgart, Germany
[22] Filed: Dec. 29, 1970
[21] Appl. No.: 102,372

[30] Foreign Application Priority Data
Jan. 14, 1970   Germany..........P 20 01 441.9

[52] U.S. Cl..................137/544, 220/86 R, 123/121, 123/136, 137/587
[51] Int. Cl.............................................F16k 45/00
[58] Field of Search ....220/86 F, 20.5; 123/119, 136; 137/544, 571, 575, 576, 587

[56]   References Cited
UNITED STATES PATENTS 3,289,711   12/1966   Hall......................220/86 R X
3,187,935   6/1965   Lense......................220/86 R
2,548,734   4/1951   Mathey....................220/86 R
2,710,651   6/1955   Hanson.....................137/576
3,125,135   3/1964   Boyer et al.............137/587 X Primary Examiner—Henry T. Klinksiek
Attorney—Craig & Antonelli

[57]   ABSTRACT

A fuel system for vehicles, especially motor vehicles, consisting of a fuel tank provided with a filling nipple adapted to be closed off in a gas-tight manner by means of a cap, an outlet or discharge line, and an expansion tank connected to the fuel tank via a branch line. A throttle is inserted in the branch line to decrease the flow cross-section of the branch line.

6 Claims, 2 Drawing Figures

Inventor:
WOLFGANG EYB
BY Craig, Antonelli, Stewart & Hill
ATTORNEYS

FUEL SYSTEMS FOR VEHICLES, ESPECIALLY MOTOR VEHICLES

BACKGROUND OF THE INVENTION

The present invention relates to a fuel system for vehicles, especially motor vehicles, and more particularly, to a fuel system consisting of a fuel tank provided with a filling nipple that can be closed off by means of a gas-tight cap, and an outlet line as well as an expansion tank connected to the fuel tank though a branch line, preferably discharging into the filling nipple, to which the venting line of the fuel system is connected.

In fuel systems for vehicles as shown, for example, in U.S. Pat. No. 3,187,935, it is known to arrange an expansion tank in the vent line of the fuel tank in order to avoid the escape of fuel into the atmosphere. Without expansion tanks, escape of fuel in the systems can be expected, especially during operation of the motor vehicle when the fuel is warmed up by, for example, the rays of the sun and, as a result, experiences a large heat expansion. In the fuel systems having an expansion tank, however, the fuel still flows out of the fuel tank through the vent line into the expansion tank when the fuel level raises at times above the mouth of the vent line in the filling nipple as a result of the vehicle being at an angle with respect to the horizontal or from driving over a rough road surface. In such cases, as also during quick filling of the fuel tank, a surge-like entrance of the fuel into the expansion tank occurs. Under such unfavorable conditions, the fuel supplied to the expansion tank assumes or occupies a considerable portion of the expansion tank volume, so that the expansion tank is no longer sufficient for further receiving the part of the fuel reserve displaced by the volume increase.

Accordingly, the effectiveness of the expansion tanks in conventional fuel systems can only be assured by a corresponding over-dimensioning of the expansion tank. It is readily appreciated that such an increase in the dimensions of the expansion tank not only increases the cost of manufacture but also is unfavorable with respect to a decrease in the useful space of the vehicle.

SUMMARY OF THE INVENTION

It is an aim of the present invention to overcome the problems and disadvantages of the prior art arrangements by utilizing an expansion tank in a fuel system, which expansion tank is as small as possible.

It is another aim of the present invention to provide a fuel system with an expansion tank, so that an unintentional and surge-like supply of fuel into the expansion tank is prevented.

It is a further object of the present invention to provide an arrangement, wherein a continuous emptying of the expansion tank into the fuel tank is assured during operation of the engine.

The foregoing problems and disadvantages have been solved in accordance with the present invention by inserting a throttle in the branch line of the fuel system leading from the gas-tight closed filling nipple to the expansion tank in order to decrease the flow cross-section of the branch line. The throttle in accordance with the present invention essentially consists of an intermediate part inserted into the branch line, whereby the flow cross-section of the branch line is smaller by a multiple of the cross-section of the discharge line from the fuel tank.

The arrangement of the present invention advantageously prevents a surge-like entry of fuel into the expansion tank but allows the fuel to gradually be transferred from the fuel tank into the expansion tank in situations where the fuel reserve expands as a result of heating or the like. By means of the present invention, a small expansion tank is sufficient, and thus it can be easily accommodated in the vehicle. The gas-tight cap of the filling nipple assures the development or formation of the vacuum in the fuel tank as a result of the increasing usage of fuel during engine operation, which vacuum causes the fuel overflowing into the expansion tank during engine operation to be sucked back into the fuel tank.

The effectiveness of the vacuum created in the fuel tank is supported by means of a smaller dimensioning of the flow cross-section of the throttle in relation to the cross-section of the discharge line and installed in the line between the filling nipple and the expansion tank.

BRIEF DESCRIPTION OF THE DRAWING

These and further aims, features and advantages will become more apparent from the following description when taken in conjunction with the accompanying drawing which shows, for purposes of illustration only, an embodiment in accordance with the present invention and wherein.

DETAILED DESCRIPTION OF THE DRAWING

Figure 1:
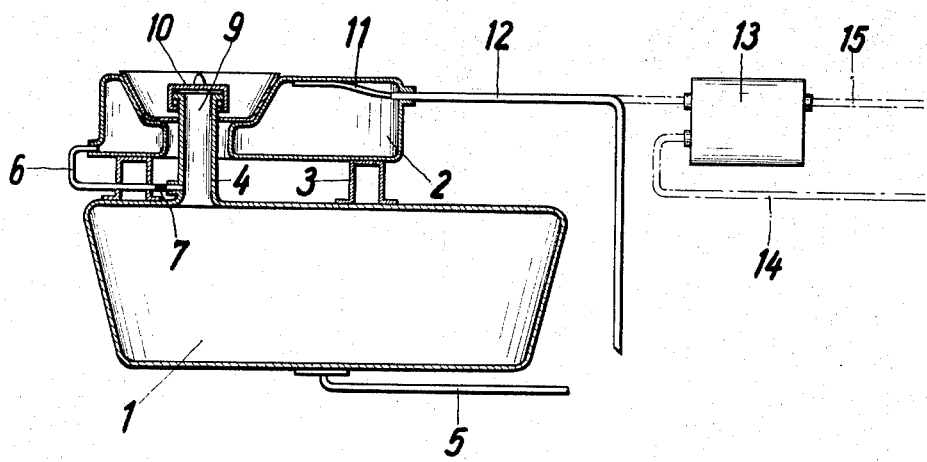
FIG. 1 is a schematic illustration of a fuel system for motor vehicles in accordance with the present invention.
Figure 2:
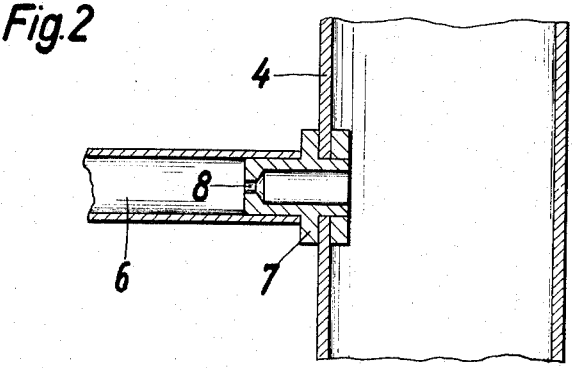
FIG. 2 is a longitudinal sectional view through the branch line including an inserted throttle according to FIG. 1 on an enlarged scale.

Referring now to the drawing and, in particular, to FIG. 1, a fuel system for a motor vehicle (not shown in detail) is provided beside a fuel tank 1 and an expansion tank 2 which is held by supports 3 on the fuel tank 1. The fuel reserve is filled into the fuel tank 1 through a filling nipple 4 and is drawn off through a discharge line 5 by means of a pump (not shown). The fuel tank 1 is connected with the expansion tank 2 through a branch line 6 leading into the filling nipple 4. An intermediate part 7 is inserted into the branch line 6 and includes a throttle bore 8 having a flow cross-section which is smaller by a multiple than the cross-section of the discharge line 5.

The opening 9 of the filling nipple 4 is closed by a cap 10 which is provided with an inlay or insert made of elastic material so as to assure a gas-tight closure. A vent line 11 is positioned along the top of the expansion tank 2 as shown in FIG. 1 in solid lines and leads either directly to the atmosphere through line 12 or, as shown in dot-dash lines, leads to a coal activated filter 13. A fresh air line 14 is connected to the filter 13, while the discharge line 15 of the filter is connected with the suction system of the engine (not shown in detail).

During filling of the fuel tank, fuel flows through the filling nipple 4 into the fuel tank 1, and the throttle 8 prevents a surge-like entry of fuel into the expansion tank 2. If the fuel reserve in the fuel tank is now warmed up, the portion of the expanded fuel flows out of the tank through the throttle bore 8 into the branch line 6 and from there into the expansion tank 2. The ensuing vapors are led through the vent line 11 either directly via line 12 into the atmosphere or through the exhaust line 15 into the intake or suction system of the engine. During engine operation and continuous usage of fuel, an increasing vacuum develops in the fuel tank which is sealed in a gas-tight manner in order to effect a sucking back of the fuel from the expansion tank into the fuel tank.

The throttle in accordance with the present invention not only avoids the surge-like entry of fuel into the expansion tank during filling of the fuel tank, but also during driving over rough spots and the like or during other transitory slanted or inclined positions of the vehicle.

While I have shown and described an embodiment in accordance with the present invention, it is to be clearly understood that the same is susceptible of numerous changes and modifications as will be apparent to one skilled in the art. I, therefore, do not wish to be limited to the details shown and described herein, but intend to cover all such changes and modifications as are encompassed by the scope of the present invention.

I claim:

1. Fuel system for vehicles, especially for motor vehicles, comprising a fuel tank, a filling nipple operatively connected with the fuel tank, cap means for closing off the filling nipple in a gas-tight manner, a discharge line connected with the fuel tank, an expansion tank, a branch line operatively connected between the expansion tank and the fuel tank, a vent line being operatively connected with the expansion tank, and a throttle means being provided in the branch line between the fuel tank and the expansion tank for reducing the flow cross-section of the branch line to limit the rate of flow of fuel between the fuel tank and the expansion tank.

2. Fuel system according to claim 1, wherein the branch line is connected with the fuel tank at the filling nipple.

3. Fuel system according to claim 1, wherein the throttle means comprises an intermediate part, which is inserted into the branch line, having a cross-section smaller by a multiple than the cross-section of the discharge line.

4. Fuel system according to claim 3, wherein the branch line is connected with the fuel tank at the filling nipple.

5. Fuel system according to claim 1, wherein the vent line directly communicates with the atmosphere.

6. Fuel system according to claim 1, wherein filter means is operatively connected with the vent line, the filter means having a discharge line adapted to be connected with the engine intake system and a fresh air line communicating with the atmosphere.

* * * * *